US012252906B2

(12) United States Patent
Matthews

(10) Patent No.: US 12,252,906 B2
(45) Date of Patent: Mar. 18, 2025

(54) OFFSET SHACKLE AND LOCKING DEVICE INCLUDING SAME

(71) Applicant: David S. Matthews, Putnam, CT (US)

(72) Inventor: David S. Matthews, Putnam, CT (US)

(73) Assignee: David S. Matthews, Putnam, CT (US)

(*) Notice: Subject to any disclaimer, the term of this patent is extended or adjusted under 35 U.S.C. 154(b) by 218 days.

(21) Appl. No.: 17/753,794

(22) PCT Filed: Jul. 17, 2020

(86) PCT No.: PCT/US2020/042523
§ 371 (c)(1),
(2) Date: Mar. 15, 2022

(87) PCT Pub. No.: WO2021/055091
PCT Pub. Date: Mar. 25, 2021

(65) Prior Publication Data

US 2022/0341222 A1 Oct. 27, 2022

Related U.S. Application Data

(60) Provisional application No. 62/901,558, filed on Sep. 17, 2019.

(51) Int. Cl.
*E05B 67/06* (2006.01)
*E05B 67/38* (2006.01)
(Continued)

(52) U.S. Cl.
CPC .............. *E05B 67/06* (2013.01); *E05B 67/38* (2013.01); *G09F 7/06* (2013.01); *G09F 7/18* (2013.01);
(Continued)

(58) Field of Classification Search
CPC ........ E05B 67/06; E05B 67/063; E05B 67/22; E05B 67/28; E05B 67/32; E05B 67/38;
(Continued)

(56) References Cited

U.S. PATENT DOCUMENTS 719,054 A * 1/1903 Snyder .................. E05B 37/025 70/52
1,308,458 A * 7/1919 Voight .................... E05B 39/04 70/53
(Continued)

FOREIGN PATENT DOCUMENTS

CN 1690337 A 11/2005
KR 101305966 B1 9/2013
(Continued)

OTHER PUBLICATIONS

PCT International Search Report and Written Opinion for International Application No. PCT/US2020/042523, dated Oct. 15, 2020, 8 pages.

*Primary Examiner* — Christine M Mills
*Assistant Examiner* — Peter H Watson
(74) *Attorney, Agent, or Firm* — Hoffman Warnick LLC

(57) ABSTRACT

The invention is related to construction, namely, discloses a shackle and a locking device comprising said shackle. The technical effect is improving the performance of the device due to a certain design of the shackle. The technical effect is achieved by the fact that the shackle comprises: a first end; a second end, and a plurality of bends between the first end and the second end, thereby forming: a first segment between the first end and a first bend, a second segment between the first bend and a second bend, a third segment between the second bend and a third bend, and a fourth segment between the third bend and the second end, wherein the first segment lies in a first plane and the fourth segment is substantially co-planar with the first segment, and the technical effect is also achieved by design options of the locking device comprising said shackle.

9 Claims, 4 Drawing Sheets

(51) Int. Cl.
*G09F 7/06* (2006.01)
*G09F 7/18* (2006.01)
*G09F 23/00* (2006.01)

(52) U.S. Cl.
CPC ...... *G09F 23/00* (2013.01); *G09F 2007/1852* (2013.01); *G09F 2007/1856* (2013.01)

(58) Field of Classification Search
CPC ...... G09F 7/06; G09F 7/18; G09F 2007/1852; G09F 2007/1856; G09F 23/00
See application file for complete search history.

(56) References Cited

U.S. PATENT DOCUMENTS

| | | | | | |
|---|---|---|---|---|---|
| 1,666,453 | A * | 4/1928 | Gyuro | E05B 37/025 70/330 |
| 3,089,269 | A * | 5/1963 | Mckiernan | G09F 7/06 211/1 |
| D392,540 | S * | 3/1998 | McDaid | D8/343 |
| 6,026,663 | A | 2/2000 | Tsung-Chuan et al. | |
| 9,657,807 | B2 * | 5/2017 | Morris | F16B 21/084 |
| 2004/0011093 | A1 | 1/2004 | Fantl | |
| 2015/0206460 | A1 * | 7/2015 | Napieralski | G09F 7/10 40/658 |

FOREIGN PATENT DOCUMENTS

| | | | |
|---|---|---|---|
| RU | 2361991 | C1 | 7/2009 |
| SU | 1090838 | A1 | 5/1984 |

* cited by examiner

OFFSET SHACKLE AND LOCKING DEVICE INCLUDING SAME

CROSS-REFERENCE TO RELATED APPLICATIONS

This application claims the benefit of U.S. Provisional Patent Application Ser. No. 62/901,558, filed 17 Sep. 2019, which is hereby incorporated in its entirety as though fully set forth.

BACKGROUND

Padlocks and similar devices are often used to affix signs or symbols to chainlink fences. The problem with such an arrangement is that the shackle of a typical padlock forces the body of the padlock to rest at an angle (i.e., not perpendicular) to the face of the chainlink fence. As such, any signage or similar feature secured to the padlock body similarly rests at an angle with respect to the fence, interfering with the ability of others to read or observe the signage.

SUMMARY

Embodiments of the invention provide an offset shackle and a locking device including such a shackle.

In one embodiment, the invention provides a shackle comprising: a first end; a second end; and a plurality of bends between the first end and the second end, thereby forming: a first segment between the first end and a first bend; a second segment between the first bend and a second bend; a third segment between the second bend and a third bend; and a fourth segment between the third bend and the second end, wherein the first segment lies in a first plane and the fourth segment is substantially co-planar with the first segment.

In another embodiment, the invention provides a locking device comprising: a lock body; a locking mechanism within the lock body; and a shackle having: a first end; a second end; a plurality of bends between the first end and the second end, thereby forming: a first segment between the first end and a first bend; a second segment between the first bend and a second bend; a third segment between the second bend and a third bend; and a fourth segment between the third bend and the second end, wherein the first segment lies in a first plane and the fourth segment is substantially co-planar with the first segment, and wherein at least one of the first end and the second end of the shackle is alternately removable from the lock body and securable within the lock body by the locking mechanism.

In still another embodiment, the invention provides a locking device comprising: a lock body; a locking mechanism within the lock body; a shackle, at least a portion of which is alternately affixable to the lock body using the locking mechanism; and a placard affixed to a surface of the lock body.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention.

DETAILED DESCRIPTION

Figure 1:
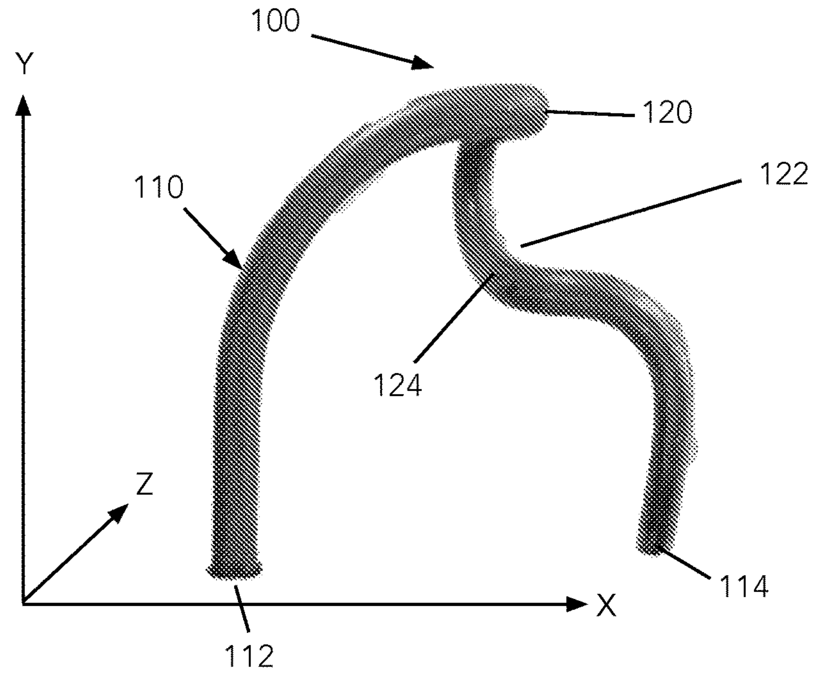
FIGS. 1 and 2 show, respectively, front and side views of a shackle according to an embodiment of the invention.
Figure 2:
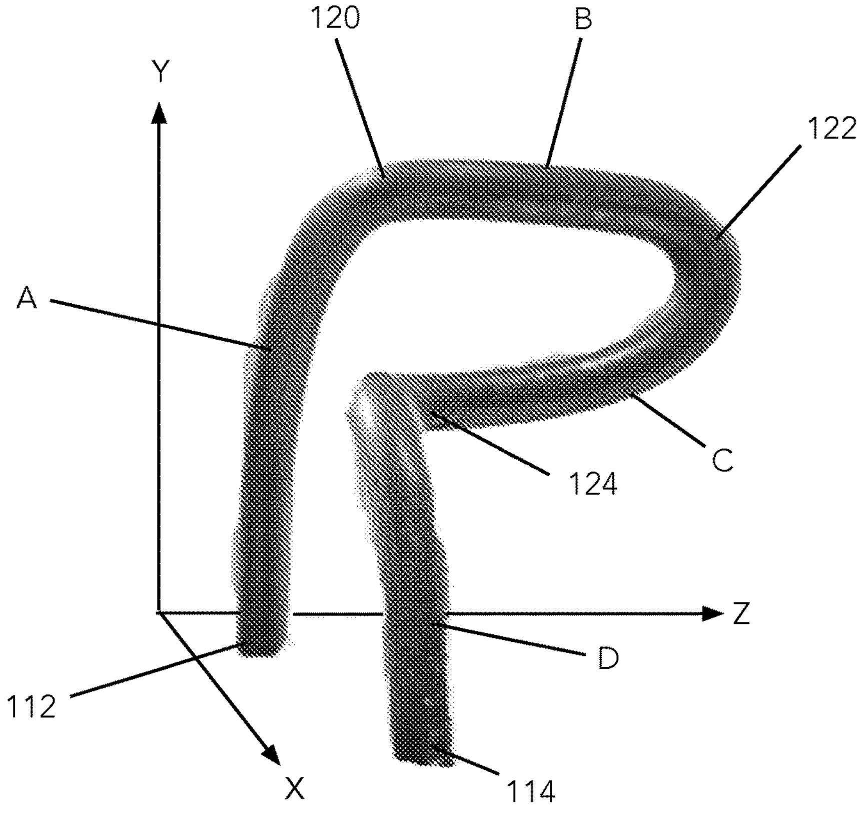

Referring now to the drawings, FIGS. 1 and 2 show front and side views, respectively, of an offset shackle 100 according to an embodiment of the invention. Shackle 100 includes a shackle body 110 having a first end 112 and a second end 114. First end 112 and second end 114 are substantially co-planar.

Between the first end 112 and the second end 114, the shackle body 110 includes a plurality of bends 120, 122, 124, each of which defines or alters the plane in which each of a plurality of segments A-D of shackle body 110 lies.

For example, beginning with the first end 112, a first segment A may be defined as a portion of shackle body 110 between the first end 112 and a first bend 120. Similarly, beginning with the second end 114, a fourth segment D may be defined as a portion of the shackle body 110 between the second end 114 and a third bend 124. In this arrangement, the first portion A and the fourth portion D of shackle body 110 lie in a first plane defined by the X and Y axes of FIG. 2 (i.e., the X-Y plane).

Continuing from first segment A, the first bend 120 alters the orientation of a second segment B of the shackle body 110 such that the second segment B lies in a second plane (the Z-Y plane) that is substantially perpendicular to the first (X-Y) plane.

A third bend 122 between the second segment B and the third bend 124 results in a third segment C that lies in the second (Z-Y) plane with the second segment B, but substantially perpendicular to the first (X-Y) plane of the first segment A and the fourth segment D.

Although described above in terms of the segments A-D being substantially co-planar or perpendicular to each other, this is neither necessary nor essential. Two segments described as being co-planar or perpendicular may, in fact, vary from these orientations in some amount. In some embodiments, such variance may be up to about ±20 degrees.

Similarly, although the first end 112 and the second end 114 are shown as terminating at approximately the same point in a third (X-Z) plane, this is neither necessary nor essential. As will be understood by one skilled in the art, the lengths of the first segment A and the fourth segment D may vary based, for example, on the requirements of a locking mechanism employed to secure either or both of the first end 112 or the second end 114 within a lock body.

Shackle body 110 may be formed of any suitable material, as will be understood by one skilled in the art. Suitable materials include, for example, steel, aluminum, and titanium, as well as mixtures and alloys thereof.

Figure 3:
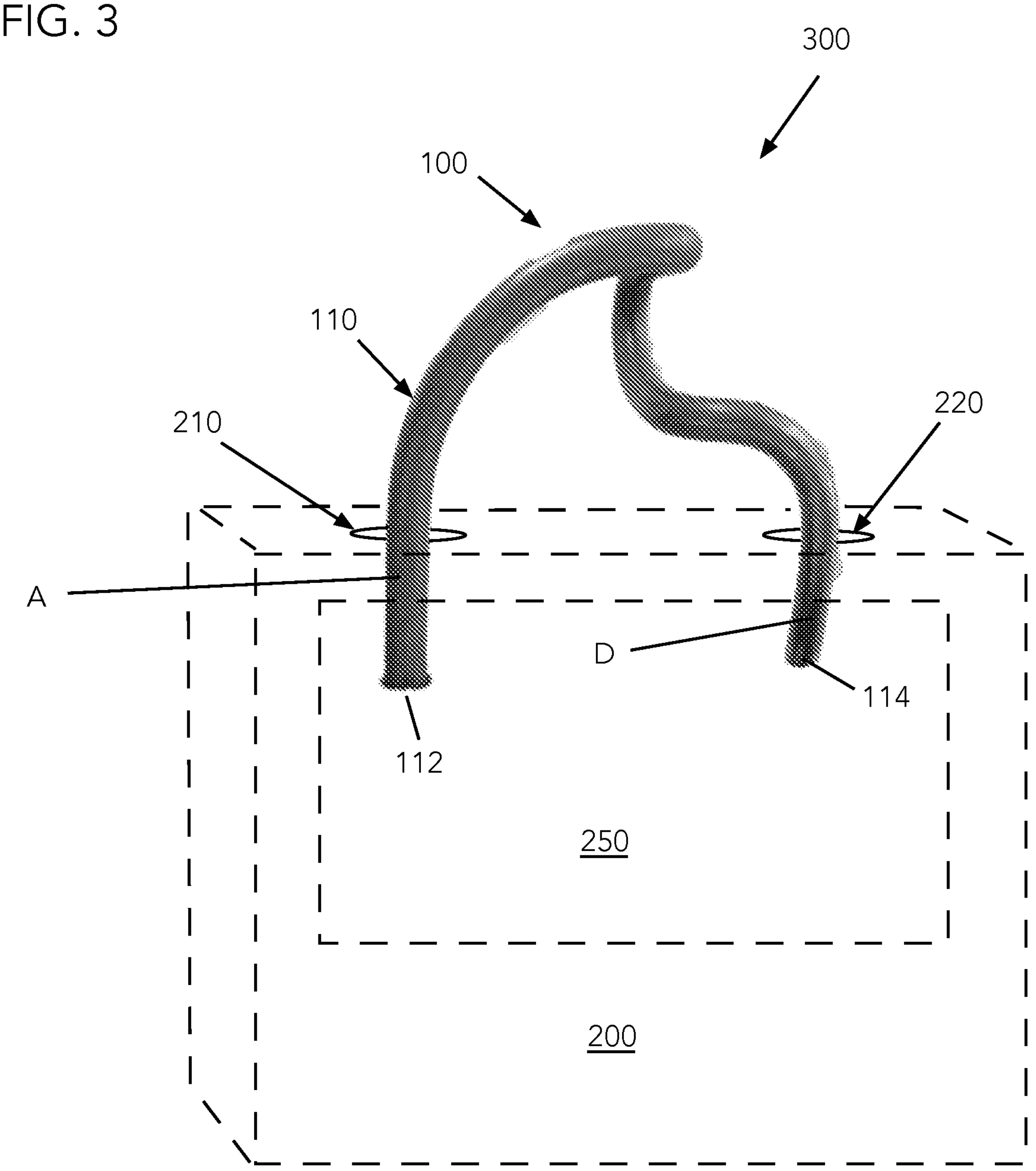
FIG. 3 shows a perspective view of a locking device according to an embodiment of the invention.

FIG. 3 shows a lock 300 according to an embodiment of the invention. The lock 300 includes a shackle 100 as described above in combination with a lock body 200 (shown in phantom) having a locking mechanism 250 (also shown in phantom). The lock body 200 and the locking mechanism 250 may be conventional devices as are known in the art. For example, the locking mechanism 250 may include a keyed mechanism, a combination mechanism, a pressure-activated mechanism, and/or a magnetically-activated mechanism.

Regardless of the particular mechanism or mechanisms employed, the locking mechanism 250 serves, as one skilled in the art would recognize, to alternately release and secure either or both of the first end 112 or the second end 114 of the shackle body 110 within the lock body 200. As such, the lock body 200 includes a first opening 210 and a second opening 220 operable to receive the first segment A and fourth segment D, respectively, of the shackle body 110.

Figure 4:
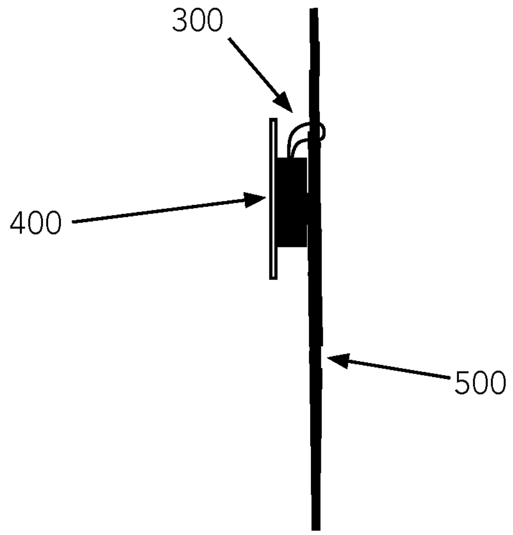
FIGS. 4 and 5 show, respectively, side and front views of a locking device in use according to an embodiment of the invention.

As noted above, one advantage afforded by the particular arrangement of the shackle 100 is its ability to orient an accompanying lock body substantially flat against a chainlink fence. For example, FIG. 4 shows a side view of a locking device 300 according to an embodiment of the invention affixed to a chainlink fence 500. A placard 400 is affixed to a surface of locking device 300 opposite the fence 500, such that the placard 400, in the form of a substantially planar surface, is disposed substantially parallel to the plane formed by the fence 500.

The placard 400 may be affixed to the locking device 300 in any manner suitable to their respective materials. For example, screws or adhesives may be used for virtually any materials that may typically be employed in forming the placard 400 or the locking device 300. In the case where both the placard 400 and the locking device 300 are metallic, the components may be welded together.

In some embodiments, it may be desirable to affix the placard 400 to the locking device 300 in a non-permanent manner, such that different placards may be alternately affixed to the locking device 300. Suitable devices for non-permanently affixing the placard 400 to the locking device 300 include, for example, magnets and hook-and-loop devices. In the case of such non-permanent affixation of the placard 400 to the locking device 300, it may be desirable to include a secondary affixing device, such as a cable or cord, between the placard 400 and the locking device 300, to prevent loss of the placard 400, in the event that the placard 400 is unintentionally dislodged from the locking device 300.

Figure 5:
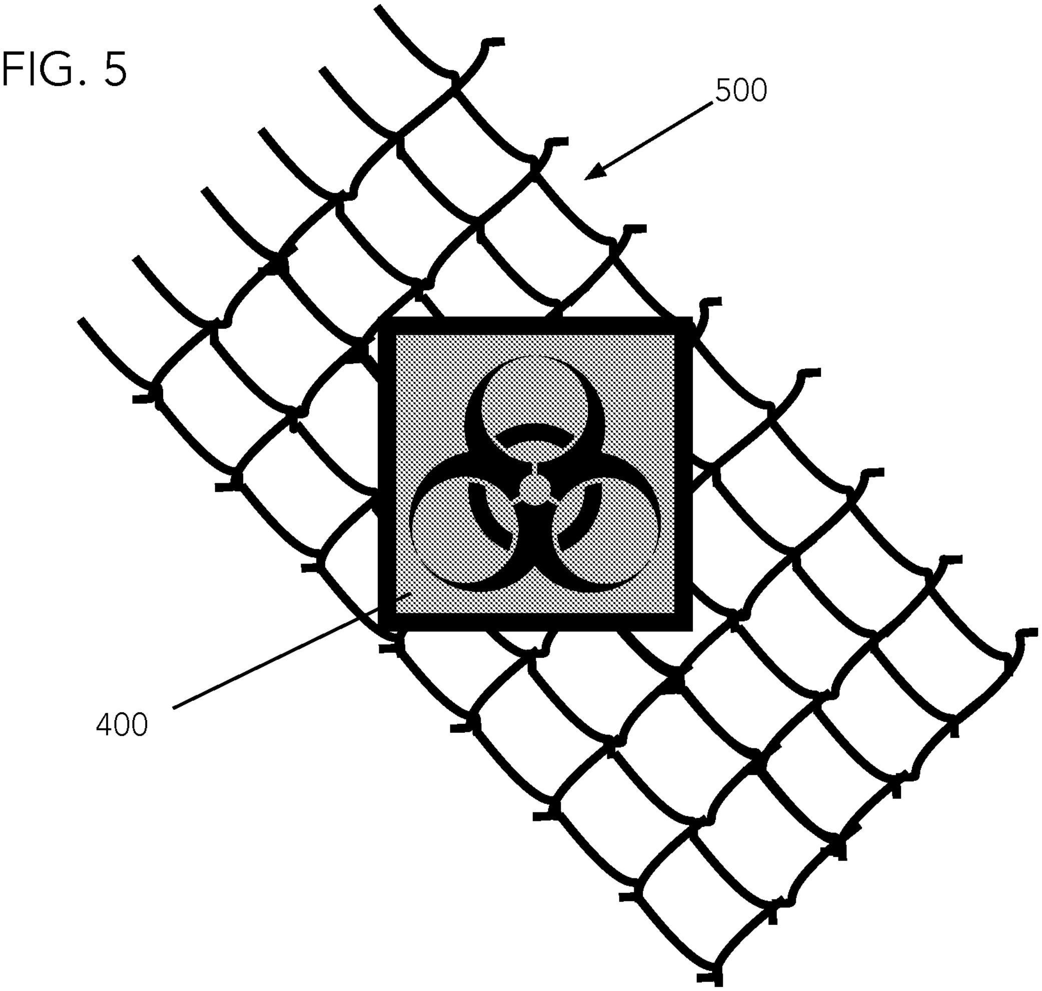

FIG. 5 shows a front view of the arrangement of FIG. 4. As can be seen, placard 400 includes a biohazard symbol. The placard 400 may include or comprise any manner of sign, symbol, text, or image, as will be recognized by one skilled in the art, depending on the needs or desires of a user.

For example, it may be necessary or desirable to advise those entering or near an area contained within a chainlink fence of any hazards posed by materials within that area. The posting of signs, symbols, or notices, such as the biohazard symbol depicted in FIG. 5, may be required by local, state, or federal law if an area contains or may contain potentially hazardous materials. In some industrial or commercial areas, these materials may periodically or regularly change, requiring the posting of new or different signs, symbols, or notices. In such situations, a locking device 300 affixed with a placard 400, such as that described above, provides an easy mechanism for changing the signs, symbols, or notices affixed to the fence.

Many other uses for the invention described are envisioned, such as the marking of entry and exit points or the identification of sponsors, etc. of events, venues, or fundraisers. In short, embodiments of the invention are applicable to any situation in which signage of any kind is to be applied to a chainlink fence. These embodiments are particularly advantageous where it is anticipated that such signage may be changed, moved, or otherwise altered or where it is necessary or desirable that such signage be disposed substantially parallel with a facing surface of the chainlink fence.

Figure 6:
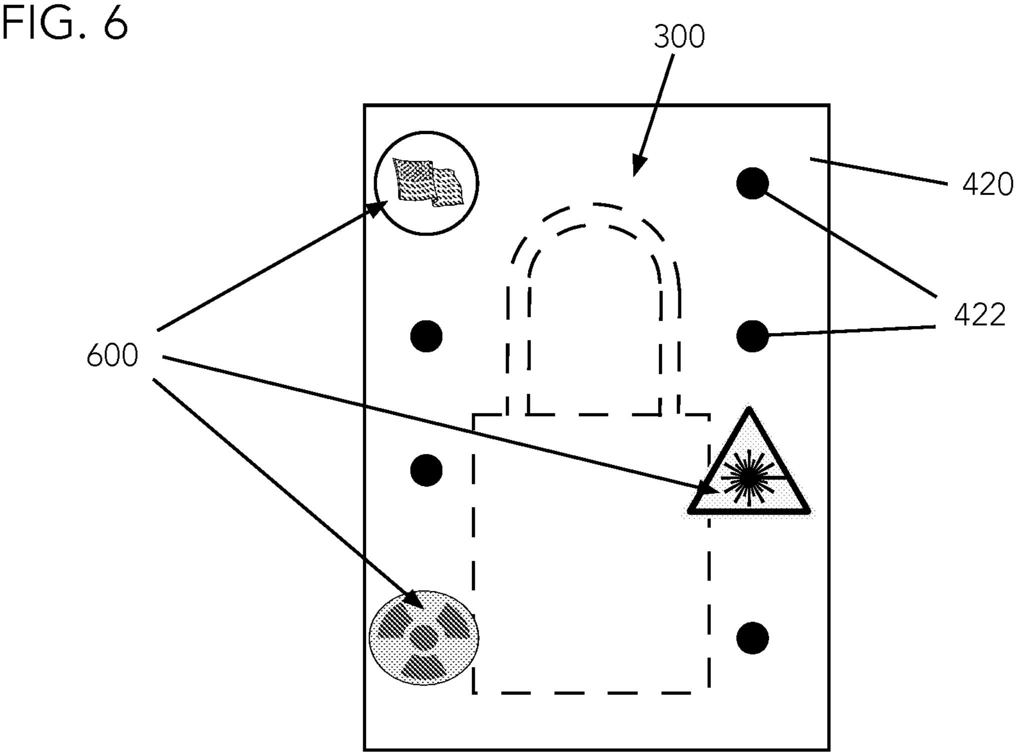
FIG. 6 shows a front view of a locking device according to another embodiment of the invention, used in combination with a plurality of plug devices.

FIG. 6 shows one such embodiment of the invention, in which the placard 420 includes one or more holes 422, through which plug devices 600 may be disposed. These plug devices 600 may include any manner of image, whether intended merely for decoration (e.g., smiley faces or emoticons) or to impart information. As in other embodiments of the invention, the placard 420 is affixed to a locking device 300, such as that described above, and which may include an offset shackle or a conventional shackle.

Figure 7:
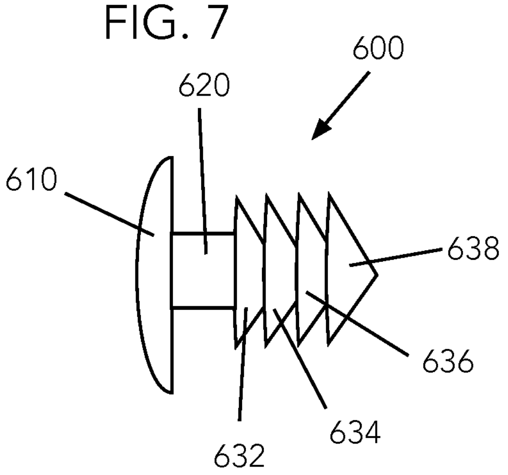
FIG. 7 shows a detailed side view of the plug device.

FIG. 7 shows a detailed side view of the plug device 600, which comprises a head 610, to which the image is affixed or printed, a shaft 620, and one or more barbed members 632, 634, 636, 638. As shown in FIG. 7, barbed members 632, 634, 636, 638 have a diameter greater than that of the shaft 620 and are deformable, as explained below.

Figure 8:
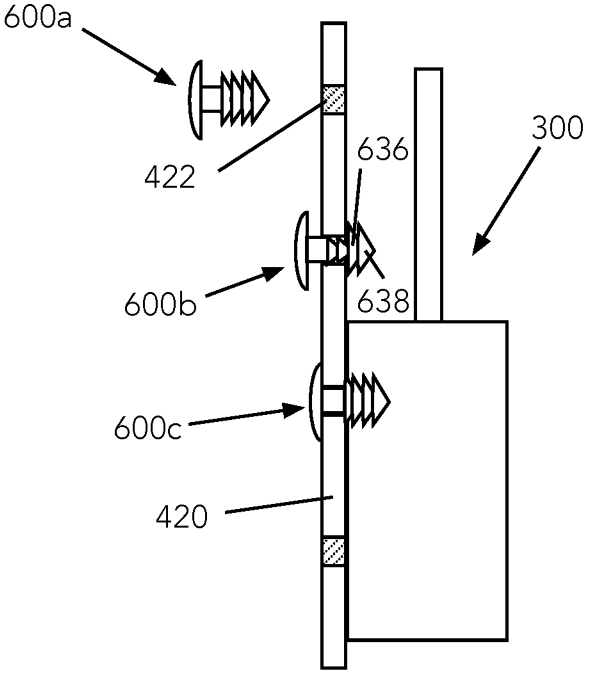
FIG. 8 shows a side view of the locking device of FIG. 6 in combination with a plurality of plug devices.

FIG. 8 shows a side view of the placard 420, as affixed to the locking device 300, as a plurality of plug devices 600 are inserted into each of a plurality of holes 422 extending through the placard 420. As can be seen, plug device 600*a* is disposed adjacent hole 422, but is not yet inserted therein. The shaft 620 (FIG. 7) of each plug member preferably has a length that is approximately the same as a thickness of the placard 420, to ensure a tight connection of the head 610 (FIG. 7) of the plug device 600 (FIG. 7) to a surface of the placard 420, though, as described below, this is neither necessary nor essential.

Plug device 600*b* is shown partially inserted into a hole (obscured) in the placard 420. Here, the two distal barbed members have passed through the placard 420 and the proximal to barbed members are temporarily deformed within the hole, which has a diameter smaller than that of the barbed members. Plug device 600*c* is shown fully inserted into a hole (obscured) in the placard 420, such that each of the plurality of barbed members has passed through the placard 420. In such a position, the head 610 (FIG. 7) and one of the plurality of barbed members preferably remain in contact with opposite surfaces of the placard 420.

The use of a plurality of barbed members on plug device 600 permits secure attachment of the plug device 600, despite some variation in the thickness of the placard 420. With a thicker placard 420, for example, only one barbed member (638 in FIG. 7) may pass completely through the placard 420, with the more proximate barbed members remaining deformed within the hole 422. With a thinner placard 420, on the other hand, all of the barbed members may pass through the placard 420, with the proximate barbed member (632 in FIG. 7) remaining in contact with the outer surface of the placard 420. As will be appreciated by one skilled in the art, any number of barbed members may be so employed in order to accommodate the full range of placard thicknesses expected. In some embodiments, the shaft 620 (FIG. 7) of the plug device may be dispensed with entirely. In embodiments employing a shaft 620, the length of the shaft 620 is preferably no longer than the thickness of the thinnest placard with which the plug device is intended to be used.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A shackle comprising:
a first end;
a second end; and
a plurality of bends between the first end and the second end, thereby forming:
a first segment between the first end and a first bend, the first segment including an arcuate portion adjacent the first bend;
a second segment comprising an entirety of the shackle between the first bend and a second bend;
a third segment comprising an entirety of the shackle between the second bend and a third bend; and
a fourth segment between the third bend and the second end, the fourth segment including an arcuate portion adjacent the third bend,
wherein the first segment lies in a first plane and the fourth segment is substantially co-planar with the first segment, the second segment lies in a second plane substantially perpendicular to the first plane and the third segment is substantially co-planar with the second segment, and the second segment is disposed more distally from both the first end and the second end than is the third segment.

2. A locking device comprising:
a lock body;
a locking mechanism within the lock body; and
a shackle having:
a first end;
a second end;
a plurality of bends between the first end and the second end, thereby forming:
a first segment between the first end and a first bend, the first segment including an arcuate portion adjacent the first bend;
a second segment comprising an entirety of the shackle between the first bend and a second bend;
a third segment comprising an entirety of the shackle between the second bend and a third bend; and
a fourth segment between the third bend and the second end, the fourth segment including an arcuate portion adjacent the third bend,
wherein the first segment lies in a first plane and the fourth segment is substantially co-planar with the first segment, the second segment lies in a second plane substantially perpendicular to the first plane and the third segment is substantially co-planar with the second segment, and the second segment is disposed more distally from both the first end and the second end than is the third segment, and
wherein at least one of the first end and the second end of the shackle is alternately removable from the lock body and securable within the lock body by the locking mechanism.

3. The locking device of claim 2, further comprising:
a placard affixed to a surface of the lock body.

4. The locking device of claim 3, wherein the placard is affixed to the lock body with an adhesive, a screw, or both.

5. The locking device of claim 3, wherein the placard is welded to the lock body.

6. The locking device of claim 3, wherein the placard is affixed to the lock body with one or more magnets.

7. The locking device of claim 3, wherein the placard includes at least one hole extending from a surface affixed to the lock body to an opposite surface.

8. The locking device of claim 7, further comprising a plug device, a portion of which is sized to pass through the at least one hole.

9. The locking device of claim 8, wherein the plug device comprises:
a head; and
at least one deformable barbed member.

* * * * *